United States Patent [19]

Noble

[11] Patent Number: 4,814,828
[45] Date of Patent: Mar. 21, 1989

[54] LIGHT SOURCE FOR PHOTOGRAPHIC COLOR PRINTING

[75] Inventor: Haven D. Noble, Mt. Pleasant, Iowa

[73] Assignee: Vivatech, Inc., Rochester, N.Y.

[21] Appl. No.: 150,697

[22] Filed: Feb. 1, 1988

[51] Int. Cl.[4] .................. G03B 27/54; G03B 27/72
[52] U.S. Cl. ........................................ 355/37; 355/70
[58] Field of Search ........................... 355/35, 37, 70

[56] References Cited

U.S. PATENT DOCUMENTS

| | | | |
|---|---|---|---|
| 3,492,070 | 1/1970 | Zahn | 355/37 |
| 3,630,609 | 12/1971 | Clapp | 355/37 |
| 3,684,371 | 8/1972 | Weisglass et al. | 355/37 X |
| 3,897,147 | 7/1975 | Simon . | |
| 3,923,394 | 12/1975 | Frankiewicz | 355/37 |
| 3,950,893 | 4/1976 | Schneider . | |
| 4,124,292 | 11/1978 | van Wandelen | 355/37 |
| 4,143,966 | 3/1979 | Gandini | 355/35 |
| 4,255,045 | 3/1981 | Eisenberg . | |
| 4,423,953 | 1/1984 | Burnham | 355/70 |
| 4,565,441 | 1/1986 | Evans . | |

OTHER PUBLICATIONS

Hausmann & Slack, "Physics" (3rd Ed., 1948), pp. 635–637.

*Primary Examiner*—Richard A. Wintercorn
*Attorney, Agent, or Firm*—Martin LuKacher

[57] ABSTRACT

A light source or lamphouse wherein light from lamps 16 of different colors, as obtained by filters 18, is projected into a full diffusing chamber 20 with diffusing reflective internal surfaces where the light is premixed. The diffusing chamber is disposed adjacent to a specular dispersing chamber 22 of greater volume than the diffusing chamber where the light is further mixed and dispersed to provide uniform illumination at an outlet; the use of both types of chambers providing efficient mixing in a limited volume so that the source can be movably mounted on the column of an enlarger or printer.

11 Claims, 3 Drawing Sheets

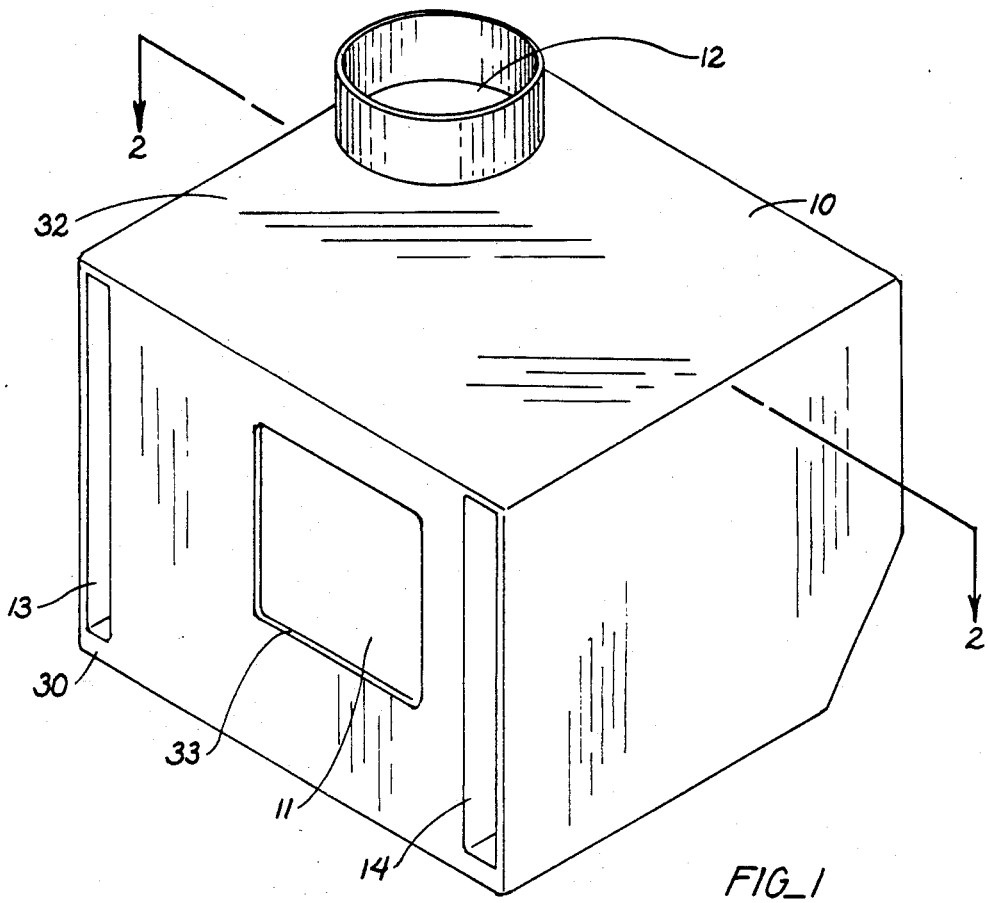
FIG_1
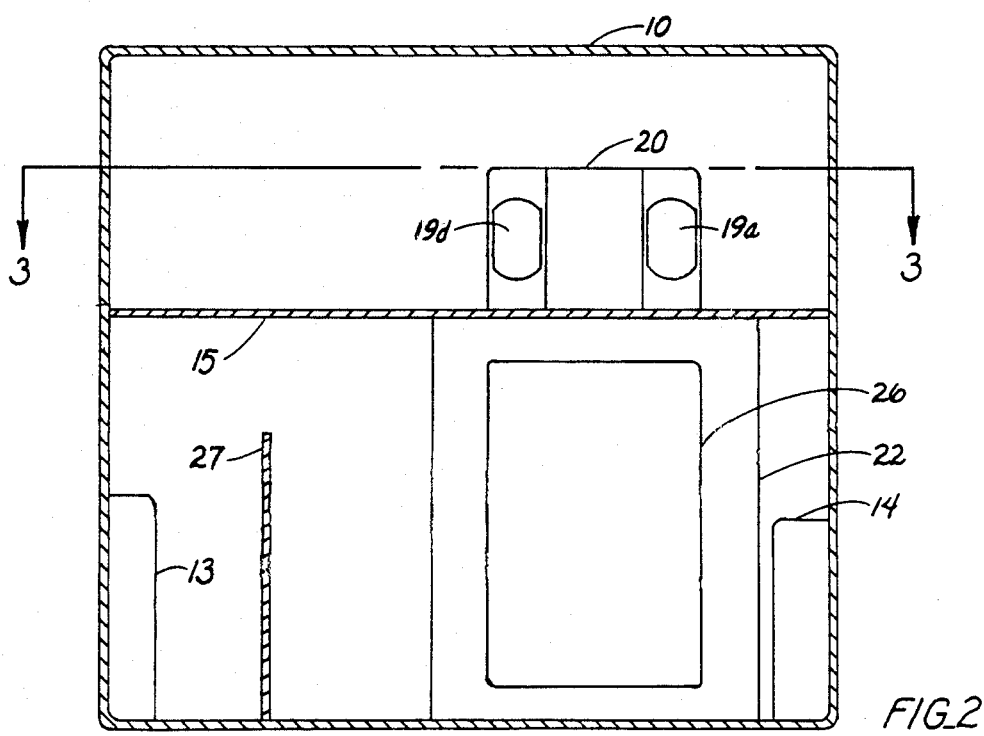
FIG_2

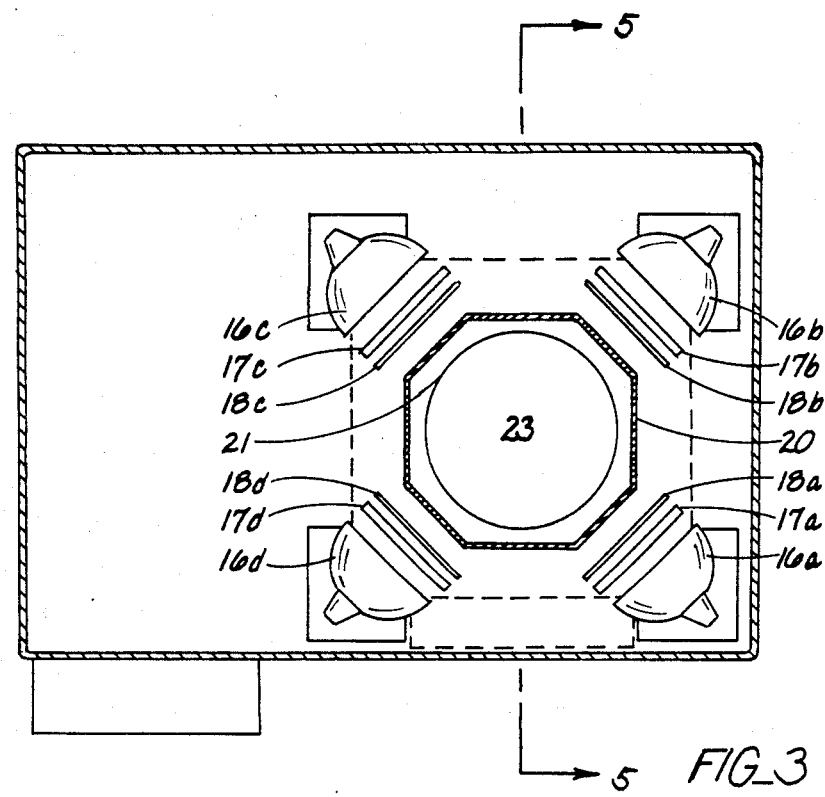
FIG_3
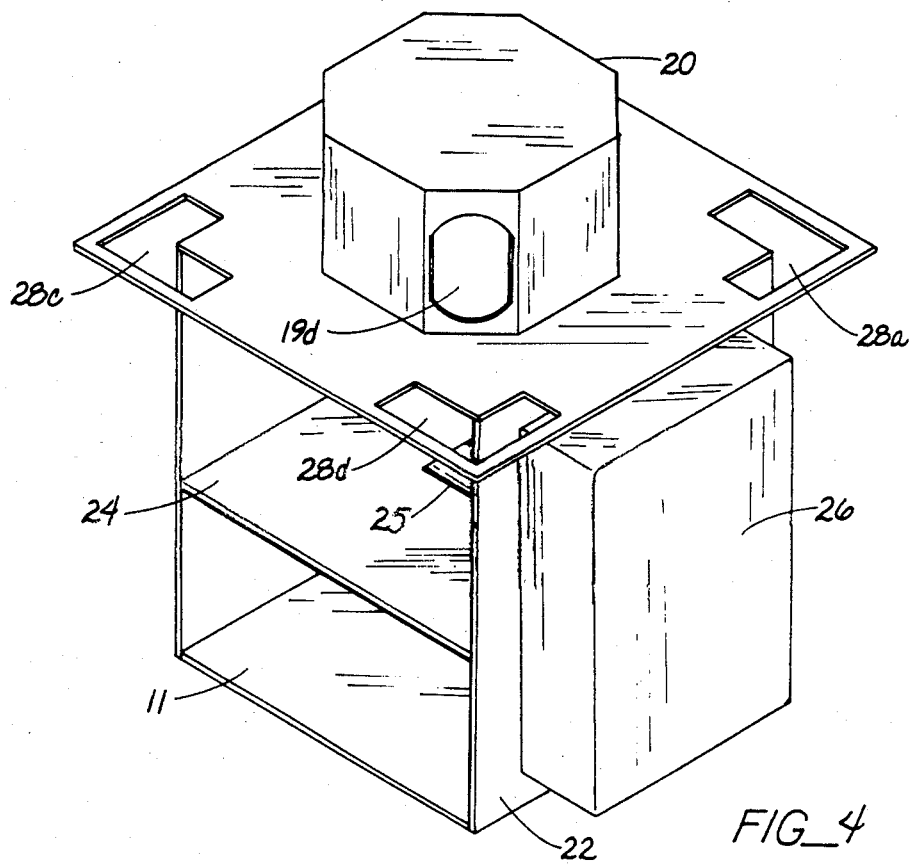
FIG_4

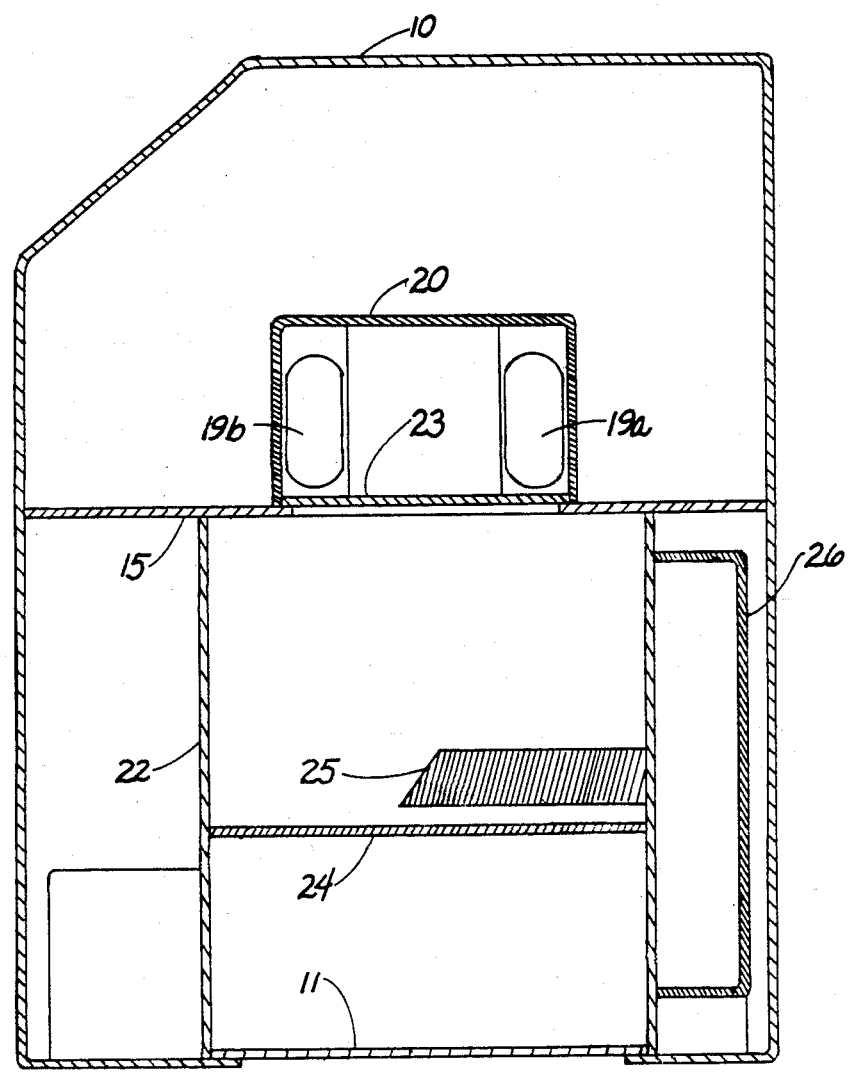
FIG_5

LIGHT SOURCE FOR PHOTOGRAPHIC COLOR PRINTING

DESCRIPTION

This invention relates to a light source for photographic color printing and enlarging and, more particularly, to a high intensity additive light source for photographic printing and enlarging. The invention is especially suitable for providing a lamphouse which may be mounted on a column or post of the enlarger for movement up and down the post. The enlarger is then equipped with a negative holder, bellows and lens, and with the lamphouse provides images for exposing photographic print paper.

In U.S. Pat. No. 4,565,441, issued to W. C. Evans and H. D. Noble on Jan. 21, 1986, there is disclosed an improved additive light source for photographic color printers as well as background information on previous additive light source or lamphouses. This invention further improves upon such light sources, particularly in reducing the size thereof and providing greater flexibility in orientation, allowing controlled, combined plural color illumination to be emitted in a downward direction, as toward the table of a printer or enlarger.

It is well known that the high intensity lamps with integral reflectors used in many additive light sources must be positioned so that their beams are directed either upward or along the horizontal. Because of this limitation, most additive light sources, such as those disclosed in U.S. Pat. No. 4,565,441 must be used with their emitted light being directed upward. While this configuration is suitable for use on some automatic color printers, it is unsuitable for use on conventional photographic enlargers where the light emitted from the light source must be directed downward. For downward illumination, reflectors must be used or the life and reliability of the lamps (halogen-type with integral reflectors) must be sacrificed. See U.S. Pat. Nos. 3,630,609, Clapp et al., December 1971; 3,827,147, Simon, July, 1975; 3,950,093, Schneider, April, 1976; 4,124,292, VanWandelen, November, 1978; and 4,255,045, Eisenberg, March, 1981.

Light sources have used a single specular mixing chamber for mixing light of the three primary colors. See U.S. Pat. Nos. 4,565,411; 4,423,953; 4,124,292 and 3,950,093. This arrangement requires a mixing chamber of significant length which makes the light source physically bulky and undesirable for use on conventional enlargers since its shape and size restricts the upward movement of the light source which is essential in making very large prints. These light sources are further restricted to illuminating negatives of relatively small size and are therefore unsuitable for use with large negative formats.

Other additive light sources such as that disclosed in U.S. Pat. No. 3,630,609 have a physical size and shape which is suitable for use on conventional enlargers, but are inefficient; producing relatively low light output. This generally makes them unsuitable for use on automatic color printers where high light output is essential to provide high printing rates. The light source disclosed in U.S. Pat. No. 3,630,609 uses a mirrored premixing chamber for premixing the light of the three primary colors, and a diffusion type chamber with white matte interior walls for further mixing and dispersing the light.

It has been discovered in accordance with the present invention, that compact size and high efficiency (light output to light input ratio) can both be obtained by constructing the light source with full diffusion premixing chamber with diffusing reflective walls (e.g., white matte interior walls) and a specular dispersing chamber with specular reflective walls (e.g. mirror walls) for further mixing and dispersing the light. This arrangement provides a light source which is extremely efficient, with high light output and very even illumination even over large areas required for large format negatives.

It is the principal object of this invention to provide an improved light source in which illumination of plural color components can be combined and controlled within a housing sufficiently small to be movably mounted on the column of an enlarger and which provides the light efficiency of much larger sources.

Another object of this invention is to provide an additive light source which is adapted to use the illumination control system disclosed in U.S. Pat. No. 4,565,441.

Still another object of this invention is to provide an improved light source which is small and compact yet provides high light output and evenness of illumination over a large area and is therefore suitable for illuminating large negatives.

A further object of this invention is to provide an improved light source which is suitable for use on both high speed automatic printers and conventional enlargers.

Briefly described, a light source embodying the invention makes use of a relatively small diffusion chamber with diffusing reflective internal surfaces, such as white matte interior walls, and a secondary larger dispersion chamber with specular reflective internal surfaces, such as mirrored interior walls. An arrangement of lamps and filters projects primary colored light into the small diffusion chamber where it is thoroughly mixed and directed into one end of the larger dispersion chamber through a primary diffuser. The dispersion chamber contains a secondary diffuser located in its interior and a final diffuser located at its outlet. A light pipe also located in the dispersion chamber transmits a portion of the light therein to a photo transducer which produces output signals representative of the intensity of the primary light components as described in U.S. Pat. No. 4,565,411. These signals are then fed to a controller where they are combined with control signals, which can be generated from an external control computer, to control the intensity of the light from the various lamps.

The terms specular and diffusing mean to produce regular reflection and scattered reflection of light, as discussed in Section 392 of the text "Physics" by Hausmann and Slack (1948).

The foregoing and other objects, features and advantages of the invention and presently preferred embodiment thereof will become more apparent from a reading of the following description in connection with the following drawings in which:

FIG. 1 is a bottom perspective view of a light source in accordance with the preferred embodiment of the invention;

FIG. 2 is a sectional view taken along the line 2—2 of FIG. 1, but with the lamps and filters removed;

FIG. 3 is a sectional view taken along the line 3—3 of FIG. 2 but with the lamps and filters now shown;

FIG. 4 is a perspective view of a portion of the interior of the light source with one wall of the dispersion chamber removed to show internal components; and FIG. 5 is a sectional view taken along the line 5—5 of FIG. 3.

Referring to the drawings, the light source includes a sheet metal outer housing 10. Light from the light source is emitted through final diffuser 11 which is mounted over a large opening 33 in the bottom wall 30 of the enclosure. The enclosure is designed so that light escapes only through this opening, to prevent unwanted stray light from fogging the photographic printing material. A ring of light absorbing soft material, e.g. felt or elastomer and the negative holder, bellows and lens are not shown to simplify the drawings. Also the post of the enlarger and the mechanism for movably mounting the source (with the rear wall 32 adjacent the post) are not shown. The rear wall 32 includes an air outlet 12 which is adapted to be connected to a suitable external fan via opaque flexible hosing for circulating air through the housing for cooling purposes. Cooling air enters through inlets 13 and 14, circulates around the internal components as will be described in more detail later, and exits the light source via outlet 12. Both air inlets 13 and 14 are constructed with light baffles to prevent unwanted light from passing through them.

The interior of the light source is separated into two major compartments by a dividing plate 15. In this preferred embodiment, a total of four white lamps and associated primary filters are used for generating light of the three primary colors. Light from the four lamps 16A through 16D is directed first through infrared rejecting filters 17A through 17D, then through primary filters 18A through 18D and into four round ports 19A through 19D located at the four corners of a small diffusing chamber 20 in which pre-mixing occurs. For printing color negatives which require a larger amount of red light, two of the primary filters located diagonally across from each other would normally be red and the remaining two would be blue and green. Different filter configurations, however, may be used for different printing materials, and a combination of red, magenta, and yellow filters may be used to increase the red light output of the light source as discussed in U.S. Pat. No. 4,565,441.

The chamber 20 has diffusing reflective surfaces provided by white matte interior side and top and bottom walls which ring a central opening 21. These surfaces provide full diffusion walls which serve to mix the incoming light and direct the light downward through the hole 21 in the plate 15 into the dispersion chamber 22. The hole 21 between the two chambers is covered with a primary diffuser 23, which serves to further scatter the light as it enters the upper portion of the dispersion chamber 22.

The dispersion chamber 22 like the diffusing chamber 20 is square in horizontal (as viewed in FIG. 5) cross section, but larger in such cross section than the diffusion chamber 20; considering of course that the corners of the diffusion chamber be cut off at 45 degree angles to the sides thereof. The interior surfaces of the sides are specular reflective. These surfaces are obtained by making the interior walls of the dispersion chamber highly reflective (polished or mirrored) and thus serve to disperse the light over a relatively large area represented by the final diffuser 11 where light is emitted from the lamphouse, and which is a plate of translucent plastic which provides the bottom of the chamber 22. The roof of the chamber around the hole 21 is painted to provide a white matte surface. An intermediate diffuser 24 is also included to further mix the light as it travels downward through the dispersion chamber. In the preferred embodiment, the primary diffuser is made of transparent prismatic glass, the intermediate diffuser is made of transparent prismatic plastic, and the final diffuser is made of translucent plastic. Of course, diffusers of various other materials may be used depending upon the degree of mixing, light output, and format size desired.

Because the hole 21 between the full diffusion chamber 20 and the dispersion chamber 22 is relatively small, and because the dispersion chamber efficiently disperses light over a large area, dispersion chambers of various cross sectional areas may be used to accommodate negative formats of various sizes. For example, a dispersion chamber with relatively small cross sectional area may be used for small negative formats, and will serve to efficiently concentrate the light over a smaller area on the final diffuser 11. For larger negative formats, however, dispersion chambers with larger cross sectional areas may be used, and yet the light being emitted from the final diffuser 11 is evenly distributed.

A portion of the light in the dispersion chamber is transmitted via a light pipe 25 to a photo transducer 26, the output signals of which are fed to an illumination controller circuit 27 which may be mounted on a circuit board (FIG. 2), as discussed in detail in U.S. Pat. No. 4,565,441.

Plate 15 serves to divide the interior of the light source into two distinct compartments. The upper compartment which contains the lamps, filters, and premix chamber is relatively warm, and the lower compartment containing the dispersion chamber, the photo transducer, and the controller are relatively cool. Plate 15 also serves as a shield to prevent infrared radiation from the lamps from heating the electronic components located in the lower compartment. As mentioned previously, relatively cool air is drawn into the lower compartment through baffled air inlets 13 and 14 and passes upward through four holes 28A through 28D in plate 15. These holes are situated with respect to each lamp so that relatively high velocity air is directed out at the base of each lamp and thereby efficiently cools them. The air which has been heated by the lamps is then drawn out through air outlet 12. The relatively cool air drawn in through the air inlet passes over various components in the lower compartment before it is heated by the lamps, and therefore maintains these components at a relatively low temperature. The arrangement described above therefore serves to very efficiently cool the internal components of the light source which permits the use of very high wattage, high intensity lamps with a relatively small external cooling fan. Also all of the lamps are mounted horizontally, as specified by the manufacturer. The lamp manufacturer specifies horizontal or upward tilt (wide ends of reflectors up). Optionally, another lamp may be mounted on top of the chamber 20 with a reflector to direct the light therefrom downwardly through an opening into the diffusion chamber 20.

It will be understood that variations and modifications of the herein described presently preferred embodiment of the invention can be made without departing from the spirit and scope of this invention. For instance larger and smaller numbers of lamps may be situated around the diffusion chamber to vary the maximum output intensity of various primary colors, and as previously mentioned, dispersion chambers of various sizes may be used to accommodate various negative formats. In the preferred embodiment, the photo transducer and controller have been included within a single enclosure, however, these can be placed in separate external enclosures so that the size of the remaining enclosure may be reduced for specific applications. Accordingly, the foregoing description should be taken as illustrative and not in a limiting sense.

I claim:

1. A light source for photographic printers and enlargers which comprises a plurality of individual sources of illumination of different color, each of said sources including a lamp, a first chamber having diffusing reflective internal surfaces into which illumination from said sources projects and is mixed, and an outlet from which said mixed illumination emanates, a second chamber separate from said first chamber having specular reflective surfaces and an inlet and an outlet, the inlet of said second chamber and the outlet of said first chamber being coupled in light communicating relationship whereby the light from said first chamber is further mixed by dispersion in said second chamber and emanates from the outlet thereof.

2. The source according to claim 1 wherein said inlet and outlet of said second chamber are at opposite ends thereof.

3. The source according to claim 1 wherein said diffusing reflective surface of said first chamber is provided by walls of matte interior finish and wherein said specular reflective surface of second chamber is provided by walls having mirror finish.

4. The source according to claim 1 wherein a plate of diffusing light transmitting material is disposed between said outlet of said first chamber and said inlet of said second chamber.

5. The source according to claim 4 wherein said inlet and outlet of said second chamber are at opposite ends of said second chamber, a diffuser plate across said outlet and another diffuser plate across said second chamber between the inlet and outlet thereof.

6. The source according to claim 5 further comprising a light pipe extending into said second chamber between said inlet and said another diffuser plate, and means responsive to the light transmitted by said pipe for controlling the illumination from said sources of illumination.

7. The source according to claim 1 wherein the volume of said first chamber is smaller than the volume of said second chamber.

8. The source according to claim 7 wherein said first and second chambers are rectilinear in cross section, said first chamber and said second chamber being disposed one above the other with said outlet and inlet openings thereof in alignment.

9. The source according to claim 8 wherein said first chamber is generally square in cross section and has walls along the sides of said square cross section and corner walls across the corners of said square cross section, openings in said corner walls, said lamps being disposed outside said first chamber in alignment with said openings.

10. The source according to claim 9 further comprising a housing having a plate with an opening therein, said first and second chambers being disposed in said housing on opposite sides of said plate, one side of said plate, said housing and said first chamber defining a first volume, the opposite side of said plate said housing and said second chamber defining a second volume, said lamps being disposed on said one side of said plate, and means for circulating air for cooling said lamps between said second volume and said first volume through openings in said housing into said second volume, openings in said plate adjacent to said lamps and an opening into said first volume.

11. The source, according to claim 4, further comprising a light pipe extending into said second chamber, and means responsive to the light transmitted by said pipe for controlling the illumination from said sources of illumination.

* * * * *